United States Patent [19]

De Deyne

[11] Patent Number: 4,733,769

[45] Date of Patent: Mar. 29, 1988

[54] DEVICE FOR COUNTING MOVING OBJECTS, SUCH AS EGGS

[75] Inventor: Jacques De Deyne, Maldegem, Belgium

[73] Assignee: Elite N.V., Maldegem, Belgium

[21] Appl. No.: 17,709

[22] Filed: Feb. 24, 1987

[30] Foreign Application Priority Data

Feb. 26, 1986 [BE] Belgium ............................ 8600482

[51] Int. Cl.⁴ .............................................. G06M 7/00
[52] U.S. Cl. ........................................ 198/503; 377/6
[58] Field of Search ..................... 198/503, 416; 377/6, 377/86, 90, 91

[56] References Cited

U.S. PATENT DOCUMENTS

| | | | |
|---|---|---|---|
| 857,996 | 6/1907 | Hague | 198/503 X |
| 3,238,694 | 3/1966 | Bartlett et al. | 198/416 X |
| 3,500,982 | 3/1970 | Belk | 198/503 X |
| 3,632,918 | 1/1972 | Anson et al. | 377/6 X |

FOREIGN PATENT DOCUMENTS 2263180 10/1975 France ............................... 198/503

Primary Examiner—Joseph E. Valenza
Assistant Examiner—Jonathan D. Holmes
Attorney, Agent, or Firm—Trexler, Bushnell, Giangiorgi & Blackstone, Ltd.

[57] ABSTRACT

A device is provided for counting moving objects, such as eggs lying on a moving conveyor belt. This device comprises a lever which can be moved by the moving objects, a signalling element for generating a detectable signal as a response to a movement of the lever, and a coupling and resetting mechanism for transmitting the movement of the lever to the signalling element and for automatically resetting both the lever and the signalling element during a decrease in the size of the portion of a moving object which is in contact with the lever, after a preceding increase thereof and the associated generation of a signal. The coupling and resetting mechanism comprises an essentially cylindrical drum which is rotatable about a shaft and which is provided with a projecting part extending essentially in a radial direction for operating the signalling element. A cord is looped round the drum. One end of the cord is attached to an extension piece of the lever and the other end is attached to an elastically deformable element for tensioning the cord around the drum. The cord is able to slip over the outside surface of the drum with friction.

7 Claims, 2 Drawing Figures

DEVICE FOR COUNTING MOVING OBJECTS, SUCH AS EGGS

BACKGROUND OF THE INVENTION

The invention relates to a device for counting moving objects such as eggs lying on a moving conveyor belt, comprising a lever which can be moved by the moving objects, a signalling element for generating a detectable signal as a response to a movement of the lever, and also a coupling and resetting mechanism for transmitting the movement of the lever to the signalling element and for automatically resetting both the lever and the signalling element during a decrease in the size of a portion of a moving object which is in contact with the lever after a preceding increase thereof and the associated generation of a signal.

Such a device is known.

In said known device the signalling element consists of an electrical switch which can be set in an open and closed position by means of an operating lever. The coupling and resetting mechanism consists of an oblong slider which is coupled on one side to the lever which can be moved by the moving objects and on the other side is attached to an end of a tension spring whose other end is attached to a fixed point. Between the two ends, the slider is in frictional contact with the end of the operating lever of the switch. The movement of said operating lever is limited by two fixed stops in a manner, such that the extreme positions of the operating lever correspond precisely to the open or closed position respectively of the switch. The movement of the lever which can be moved by the moving objects is transmitted to the switch via the slider and the operating lever, as a result of which a signal is generated. During a further movement of the moveable lever in a certain direction the slider slides over the end of the operating lever of the switch, said operating lever being up against one of its two stops. During a movement of the moveable lever in the opposite direction, the operating lever of the switch will be brought to its other extreme position by the slider, under which circumstances the switch is switched over. In a further movement of the moveable lever, the slider will now slide again over the end of the lever. During operation the end of the lever which can be moved by the moving objects is placed in the path of said objects. As an object passes, the end of the lever slides over the surface of the object to be counted.

Although the abovementioned device can be satisfactorily used for counting moving objects, such as eggs lying on a moving conveyor belt, the device has the disadvantage that the coupling and resetting mechanism is fairly difficult to install and to adjust. In addition, the satisfactory operation of the device is to a considerable degree dependent on the friction between the slider and the end of the operating lever of a switch. Since said friction is dependent on various factors, correct operation of the device is not always guaranteed.

SUMMARY OF THE INVENTION

It is the object of the present invention to provide a device for counting moving objects which does not have the abovementioned disadvantages, has a simple design, is easy to install and operates reliably.

This object is achieved according to the invention by a device of the above type which is characterized in that the coupling and resetting mechanism comprises an essentially cylindrical drum which is rotatable about a shaft and which is provided with means for operating the signalling element, and also a cord, looped round the drum, one end of which is attached to an extension piece of the lever and the other end of which is attached to an elastically deformable element for tensioning the cord around the drum, the cord being able to slide over the outside surface of the drum with friction.

Such a coupling and resetting mechanism is very simple, easy to install and requires no further adjustment. Since the cord can be in contact with the drum over a fairly large arc, a good contact between the cord and the drum is guaranteed.

The operating means for the signalling element consist preferably of a projecting part on the drum extending essentially in the radial direction, one side of which can interact with the operating point of the signalling element to generate a signal. Such an operating means is extremely simple and, in addition, the transmission ratio between the movement of the lever which can be moved by the moving objects and the movement of the projecting part at the position of an operating point can be adjusted by adjusting the distance between the center of rotation of the drum and the operating point of the signalling element.

In order to limit the movement of the drum in the direction opposite to the direction of movement for operating the signalling element, the device is provided with a fixed stop which is preferably situated at a small distance opposite the operating point of the signalling element, the projecting piece on the drum extending between the fixed stop and the operating point.

The device may further be provided with means for positioning the moving objects to be counted, which positioning means preferably consists of narrow strips of flexible material, preferably rubber, which extend in the path of the moving objects and are attached outside said path.

The invention will now be explained in more detail by means of the description of an exemplary embodiment of the device according to the invention with reference to the accompanying drawings.

DETAILED DESCRIPTION OF THE PREFERRED EMBODIMENT

Figure 1:
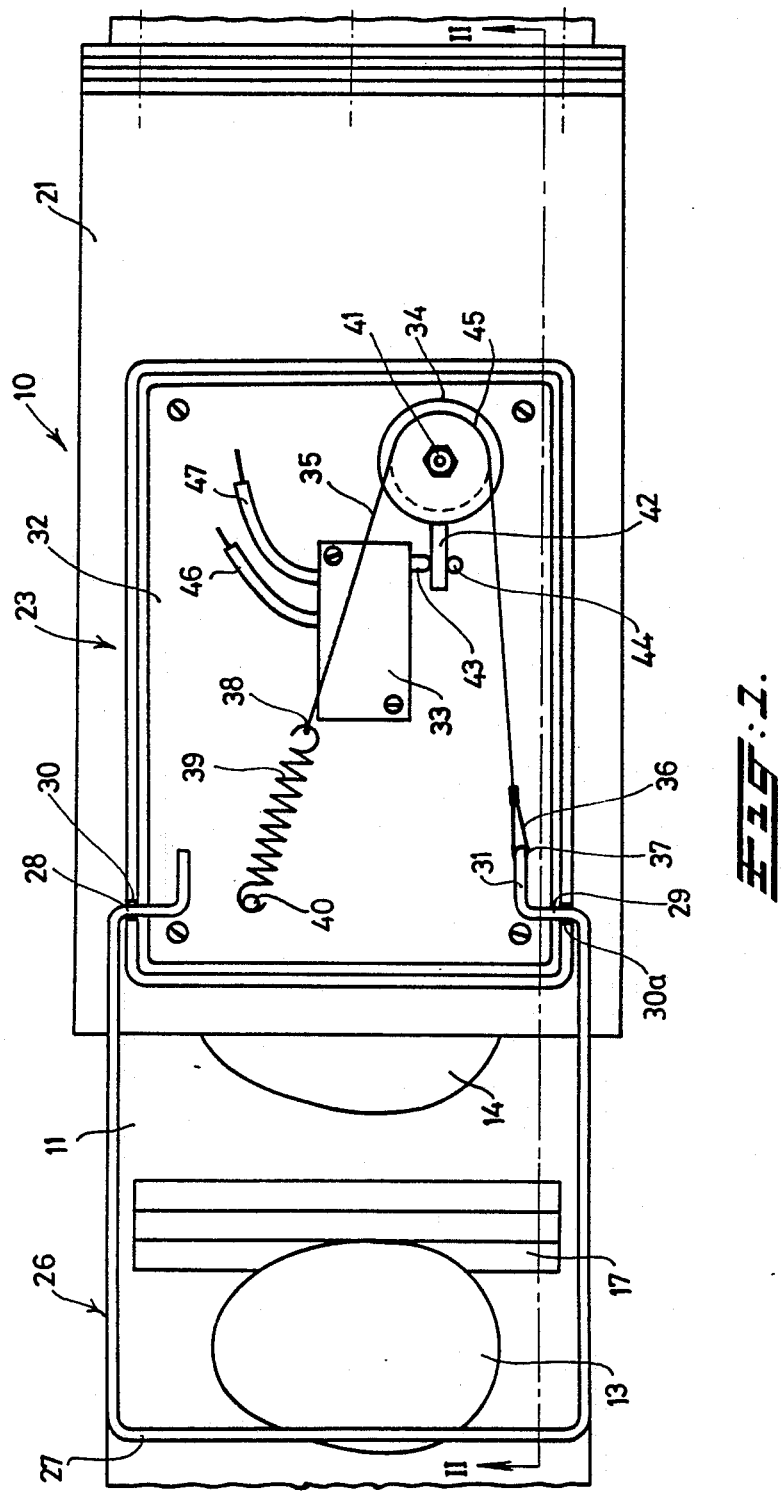
FIG. 1 is a plan view of the counting device according to the invention.
Figure 2:
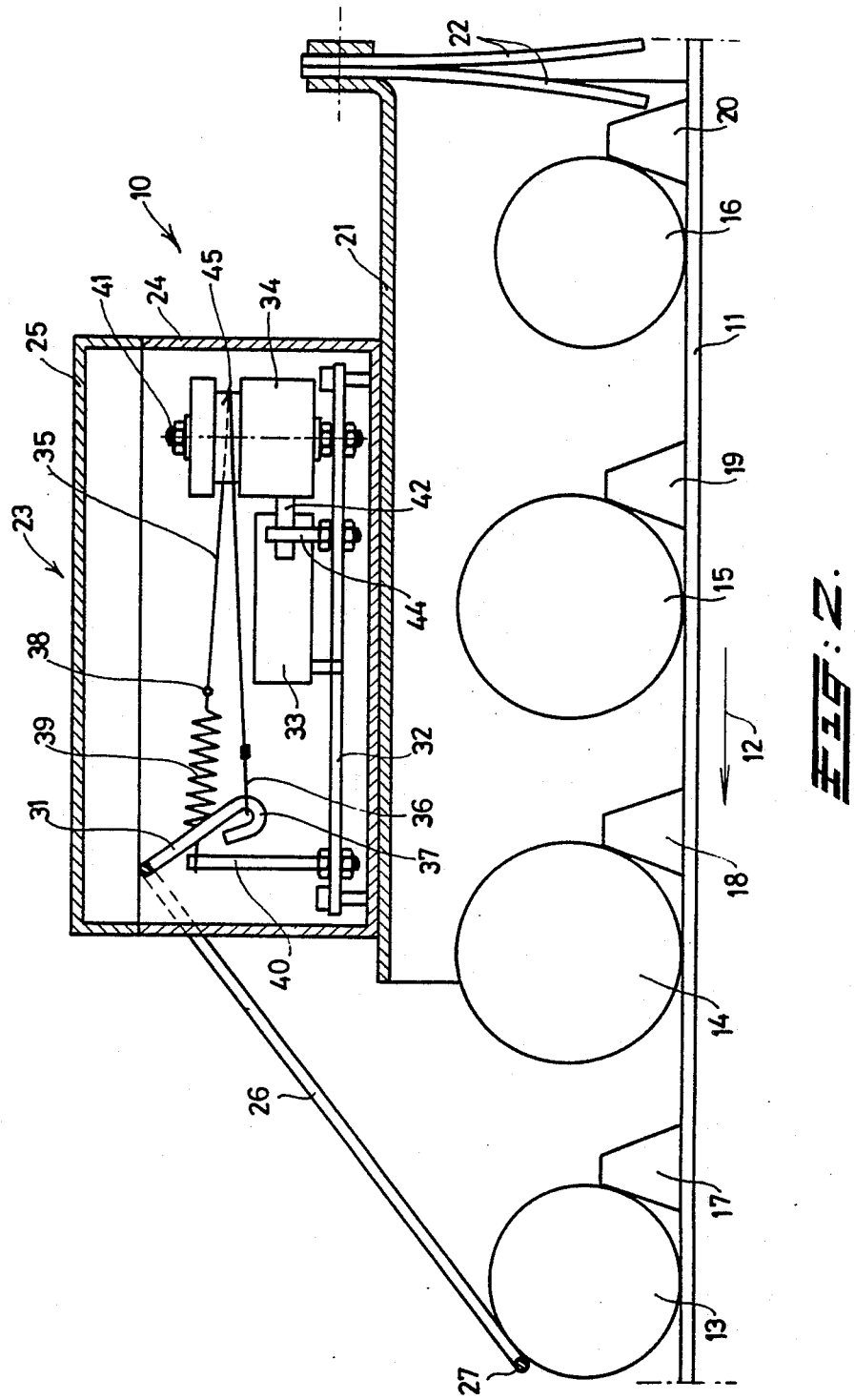
FIG. 2 is a view in section of the device of FIG. 1 along the line II—II.

FIGS. 1 and 2 show a counting device according to the invention which is in general indicated by the reference numeral 10. The device shown is a device for counting eggs. It will be clear that the counting device can also be used for counting objects other than eggs.

The figures show a conveyor belt 11 which is moved in a direction 12. The conveyor belt 11 is provided with compartments for receiving the eggs 13, 14, 15, 16, etc. which compartments are formed, in this example, by raised ribs 17, 18, 19, 20 disposed at regular distances on the belt 11. The mutual distance between the raised ribs is such that only one egg can be received in a compartment, it being possible for the size of the egg to vary between fairly wide limits. The conveyor belt may also be a bartype belt, the ribs being formed by the bars.

A carrier 21 for the actual counting device is situated above the conveyor belt 11. Said carrier 21 consists of a profiled part having an essentially U-shaped cross-section, the open side of the U being situated on the underside. The height of the profile is such that the eggs 13-16 lying on the belt 11 can easily pass under it.

At the side at which the eggs are fed in, there are attached to the carrier 21 narrow strips 22 which hang downwards and which are formed from a flexible material, for example rubber. The strips 22 reach down into the path of the egg to be counted and have the object of positioning the eggs in the compartments, in particular, in a manner such that the longitudinal axis of the eggs ends up lying transversely to the direction of movement of the conveyor belt.

The actual counting device, which is in general indicated by 23 is installed on the carrier 21. The mechanism of the counting device is received in a housing 24 having a detachable cover 25. Outside the housing there extends a lever 26, the end 27 of which extends down into the path of the moving eggs 13, 14, 15 and 16 etc. In the embodiment shown, the lever is formed from relatively thin light wire material and has essentially the shape of a U. The end portions 28 and 29 of the legs of the U-shaped lever are bent inwards and project from the outside through openings 30 and 30a in the wall of the housing 24. Inside the housing, the bent end portion 29 is provided with an extension piece 31 which is essentially perpendicular to the plane in which the U-shaped lever 26 is situated.

A mounting plate 32 is furthermore disposed inside the housing 24. The mechanism of the counting device is mounted on said mounting plate 32. Said mechanism comprises a signalling element in the form of a switch 33 for generating a detectable signal, and also a coupling and resetting mechanism. The coupling and resetting mechanism comprises an essentially cylindrical drum 34 and a cord 35, looped round the drum 34, one end 36 of which is attached to the end 37 of the extension piece 31 of the lever 26 and the other end 38 of which is attached to one end of a tension spring 39 whose other end is attached to a fixed pin 40 mounted on the mounting plate 32 and situated essentially perpendicular thereto. The spring 39 stretches the cord 35 round the drum 34. The cord 35 can slide over the outside surface of the drum 34 with friction.

The drum 34 is rotatable about a shaft 41 mounted on the mounting plate 32 and situated essentially perpendicular thereto. The drum 34 is provided with a pin 42, extending essentially radially, one side of which can interact with the operating point 43 of the switch 33. An upright pin 44, which serves as a fixed stop for limiting the movement of the pin 42 in the direction away from the operating point 43 of the switch 33, is furthermore mounted on the mounting plate. The pin 44 is placed at a small distance opposite the operating point 43 and the pin 42 on the drum 34 extends between the fixed pin 44 and the operating point 43 of the switch 33.

In the embodiment shown, the drum 34 is provided on the circumference with a circumferential groove 45 for receiving the cord 35.

The operation of the device will now be explained in more detail.

When an egg 13 on the conveyor belt moving in the direction 12 passes the end 27, which is located in the path of the eggs, of the U-shaped lever, the lever will first be moved upwards by the egg 13 (see FIG. 2). The end 37 of the extension piece 31 of the lever will move to the left in FIG. 2 and take with it the end 36 of the cord 35. The cord 35 then moves against the pulling force of the spring 39 and takes with it the drum 34, which is turned clockwise (see FIG. 1). The pin 42 on the drum 34 then presses in the operating point 43 of the switch 35 which generates a signal which is transmitted via the electrical leads 46 and 47 to a pulse counter which is not shown here.

As the egg 13 moves further, the end 27 of the lever 26 is moved further upwards, and as a result of this the end 37 of the extension piece 31 is moved further to the left. The further clockwise movement of the drum 34 is, however, blocked by the switch 33. The cord will then start to slip over the outside surface of the drum until the end 27 of the lever 26 comes into contact with the highest point of the egg 13. From that moment onwards the end 27 of the lever 26 will move downwards again under the influence of the pulling force of the spring 39, which pull the end 37 of the extension piece 31 of the lever to the right via the cord 35. At the same time the cord 35 will impart to the drum a movement in an anti-clockwise direction. The pin 42 on the drum 34 then moves away from the switch, as a result of which the switch 33 goes into the non-activated state, which is again registered by the pulse counter. The pin 42 then comes up against the pin 44 which acts as a fixed stop and which blocks the further movement of the pin 42 and the drum 34. As the movement of the egg 13 continues, in which process the end 27 of the lever moves further downwards, the cord 35 will again start to slip over the drum 34 under the influence of the pulling force of the spring 39, but now in a direction opposite to the direction of slip during the upward movement of the end 27 of the lever 26.

When the egg 13 has gone completely past the end 27 of the lever 26, the end 27 is again in the lowermost extreme position. When the next egg 14 on the moving conveyor belt 11 passes the end 27 of the lever 26, the process described above will repeat itself and the switch 33 will generate a signal which indicates that an egg is passing again. This signal is again picked up by the pulse counter which is not shown.

As is evident from the above description, only the beginning of the upward or downward movement of the end 27 of the lever 26 is registered. The size of the egg which is passing the end 27 of the lever 26 has no effect under these circumstances since during the rest of the upward or downward movement of the end 27 of the lever the cord 35 slips over the drum 34. The size of the eggs to be counted can thus vary between fairly wide limits, which limits are determined by the possible extreme positions of the end 27 of the lever 26.

From the above it is evident that the counting device according to the invention can perform reliable counting of objects whose size is within predetermined, fairly wide limits. The construction of the counter is simple, no additional adjustments being necessary for the counting device to function satisfactorily. The counter is not susceptible to faults and can very readily be used in environments in which contamination easily occurs such as in the vicinity of laying batteries for hens.

It will be clear that, with the scope of the invention, other embodiments are also possible in which the movement of the lever moved by the moving objects is transferred to a signalling element via a cord and a drum.

What is claimed is:

1. A device for counting moving objects, such as eggs lying on a moving conveyor belt, comprising a lever which can be moved by the moving objects, a signalling element for generating a detectable signal as a response to a movement of the lever, and also a coupling and resetting mechanism for transmitting the movement of the lever to the signalling element and for automatically resetting both the lever and the signalling element during a decrease in the size of the portion of a moving object which is in contact with the lever, after a preceding increase thereof and the associated generation of a signal, the coupling and resetting mechanism comprising an essentially cylindrical drum which is rotatable about a shaft and which is provided with means for operating the signalling element and also a cord, looped round the drum, one end of which is attached to an extension piece of the lever and the other end is attached to an elastically deformable element for tensioning the cord around the drum, the cord being able to slip over the outside surface of the drum with friction.

2. Device according to claim 1, wherein the operating means for the signalling element consists of a projecting part on the drum extending essentially in a radial direction, one side of which can interact with an operating point of the signalling element to generate a signal.

3. Device according to claim 1, wherein a fixed stop is provided for limiting the movement of the drum in the direction opposite to the direction of movement for operating the signalling element.

4. Device according to claim 1, wherein the operating means for the signalling element consists of a projecting part on the drum extending essentially in a radial direction, one side of which can interact with an operating point of the signalling element to generate a signal, a fixed stop is situated at a small distance opposite the operating point of the signalling element and the projecting part on the drum extends between the fixed stop and the operating point.

5. Device according to claim 1, wherein the drum is provided on the outside circumference with a circumferential groove in which the cord is placed.

6. Device according to claim 1, wherein means are provided for positioning the moving objects to be counted.

7. Device according to claim 6, wherein the positioning means consist of narrow strips of a flexible material, preferably rubber, extending into the path of the moving objects and mounted outside said path.

* * * * *